(12) United States Patent
Ibrahim

(10) Patent No.: US 6,443,407 B1
(45) Date of Patent: Sep. 3, 2002

(54) ACCESSORY TRAY FOR A TRIPOD

(76) Inventor: Zafar Y. Ibrahim, 8412 Steilacoom Blvd., SW. #15, Lakewood, WA (US) 98498

( * ) Notice: Subject to any disclaimer, the term of this patent is extended or adjusted under 35 U.S.C. 154(b) by 0 days.

(21) Appl. No.: 09/854,241

(22) Filed: May 14, 2001

Related U.S. Application Data

(60) Provisional application No. 60/247,486, filed on Nov. 13, 2000.

(51) Int. Cl.$^7$ .............................................. F16M 11/32
(52) U.S. Cl. ................................................... 248/163.2
(58) Field of Search ........................... 248/163.1, 163.2, 248/177.1

(56) References Cited

U.S. PATENT DOCUMENTS

| | | | | |
|---|---|---|---|---|
| 4,501,201 A | * | 2/1985 | Fitzner et al. ................. | 108/27 |
| 5,404,280 A | * | 4/1995 | Greek et al. ................. | 362/198 |
| 5,522,514 A | * | 6/1996 | Robinson ..................... | 211/188 |
| 5,632,230 A | * | 5/1997 | Dornetta ...................... | 119/537 |
| 5,715,954 A | * | 2/1998 | Zaremba ...................... | 211/107 |
| 5,992,407 A | * | 11/1999 | Tsai ............................. | 126/40 |
| 6,311,641 B1 | * | 11/2001 | Johnson ....................... | 119/57.8 |

OTHER PUBLICATIONS

US 2002/0011196 A1, inventor Floyd, II et al., published on Jan. 31, 2002.*

* cited by examiner

Primary Examiner—Ramon O. Ramirez
(74) Attorney, Agent, or Firm—Richard L. Huff

(57) ABSTRACT

Accessory trays supported between the legs of a camera tripod. In a first embodiment, a semicircular tray having side walls is supported on the stabilizing arms or the end cap of a camera tripod and is attached to the lower portion of the center post by a retaining device. In a second embodiment, two semicircular trays are supported on the stabilizing arms of a camera tripod and surround the center post. In the second embodiment, each semicircular portion has a recess into which the center post fits. In this second embodiment, the semicircular portions are attached to each other in a variety of ways.

4 Claims, 5 Drawing Sheets

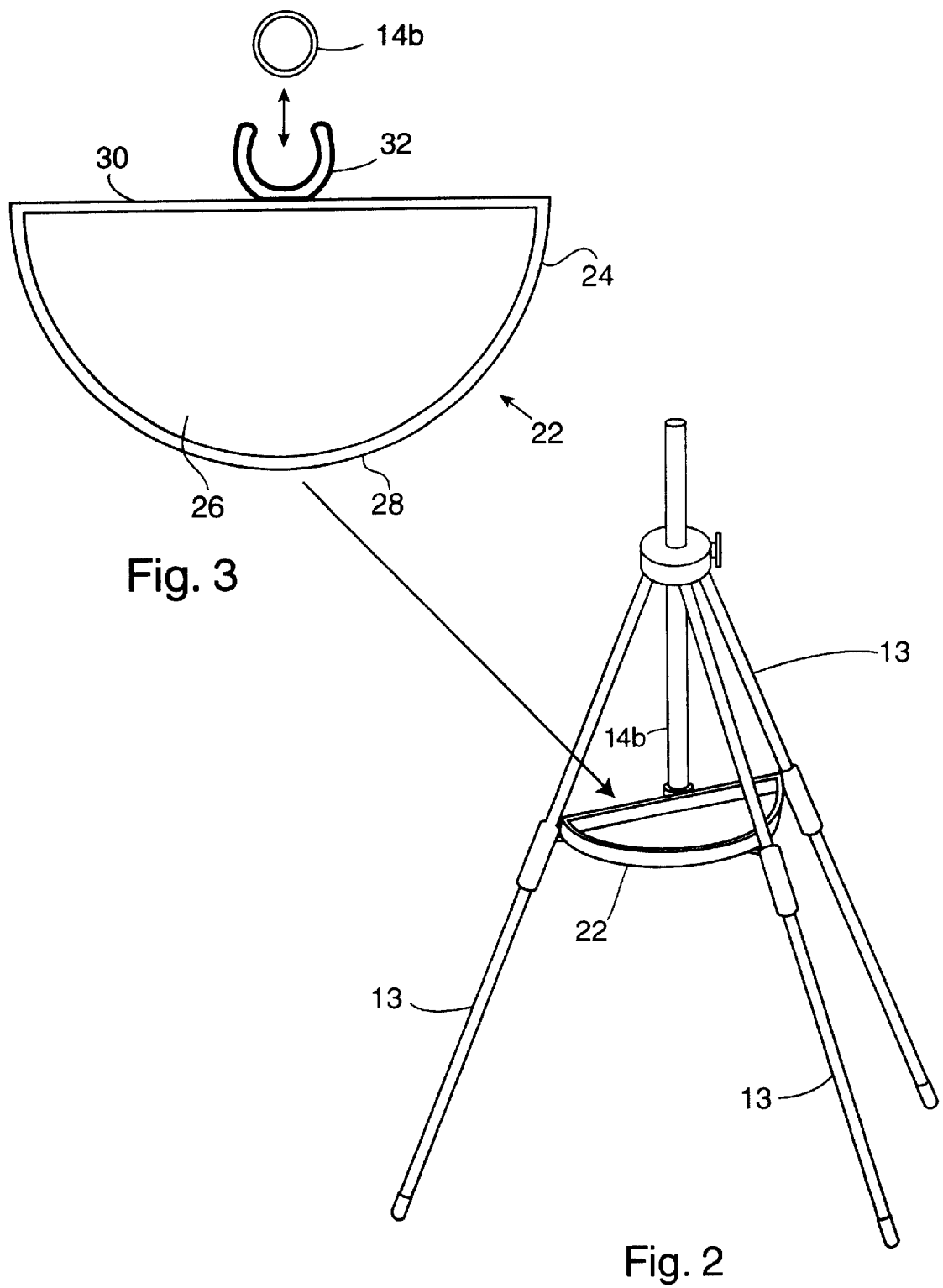

ACCESSORY TRAY FOR A TRIPOD

CROSS-REFERENCE TO RELATED APPLICATIONS

This application claims the priority date of U.S. provisional application Ser. No. 60/247,486, filed Nov. 13, 2000.

BACKGROUND OF THE INVENTION

1. Field of the Invention

The present invention relates generally to trays that attach to a cylindrical column. More particularly, the invention relates to trays that removably attach to a central column of portable support devices, such as a tripod used for photography, a book or document holder, a sheet music stand, or an artist's easel.

2. Description of the Related Art

The state of the art includes various trays that attach to columns, none of which is well suited for use with a camera tripod or similar device. U.S. Pat. No. 5,715,954 to Zaremba discloses a donut-shaped tray for displaying items. The tray has a central aperture which receives a pole. The pole must be slid through the aperture. U.S. Pat. No. 5,803,265 to Bergerman discloses a tray for use with an umbrella post for a patio table. The tray has a circular-shaped single-piece body with a slot which receives the post so the tray can be installed on the post without sliding the post through an aperture. U.S. Pat. No. 5,335,803 to O'Brien discloses two semicircular trays adapted to fit around the umbrella pole of a picnic table to form a single round tray. The straight sides of the tray contain upper and lower tabs which will serve to hold the trays together. The upper tabs intrude upon the available tray space and tend to gather hard-to-remove spilled materials in the angles between the tray and the tabs. U.S. Pat. No. 5,522,514 to Robinson discloses trays designed for use with umbrella posts on patio tables. The trays are circular in shape having two semicircular pieces joined at the center. The two halves are assembled around the post using a combination of dowel pins and dowel seats and lock pins revovably seated into lock pin seats. Here, again, spilled material accumulates in the lock pin seats, and the small open area of these seats makes cleaning difficult. U.S. Pat. Nos. 4,501,201 and 4,383,487 to Fitzner et al. disclose trays that are clampable to a microphone stand or the like. The circular tray is in two halves which bolt together along the joint. The juncture is made by a ridge of material extending below the tray and the tray is fixedly clamped to the stand. U.S. Pat. No. 4,953,716 to Rapoport discloses an accessory tray designed to clamp on the center post of a camera tripod. The tray is rectangular in shape and has a V-groove type clamp. The tray is designed to attach to the portion of the center post above the juncture of the tripod legs, and will not readily pivot since it is clamped to the post. Because of the size and shape of the tray, it cannot be installed on the lower portion of the center post to be sheltered by the tripod legs. It must be installed on the upper portion of the center post where it extends out into the air. Consequently, articles on the tray may inadvertently be knocked off by someone brushing against the tray.

SUMMARY OF THE INVENTION

The present invention provides an improved accessory tray designed for use with a camera tripod which attaches to, and readily pivots about, the center post below the juncture of the tripod legs so it is sheltered by the tripod legs.

BRIEF DESCRIPTION OF THE DRAWING

FIG. 2 is a perspective view of the tripod of FIG. 1 with one embodiment of a tray of the present invention installed.

FIG. 3 is a top view of the tray of FIG. 2 and the center post of the tripod showing the tray detached from the post.

DESCRIPTION OF THE PREFERRED EMBODIMENTS

Figure 1:
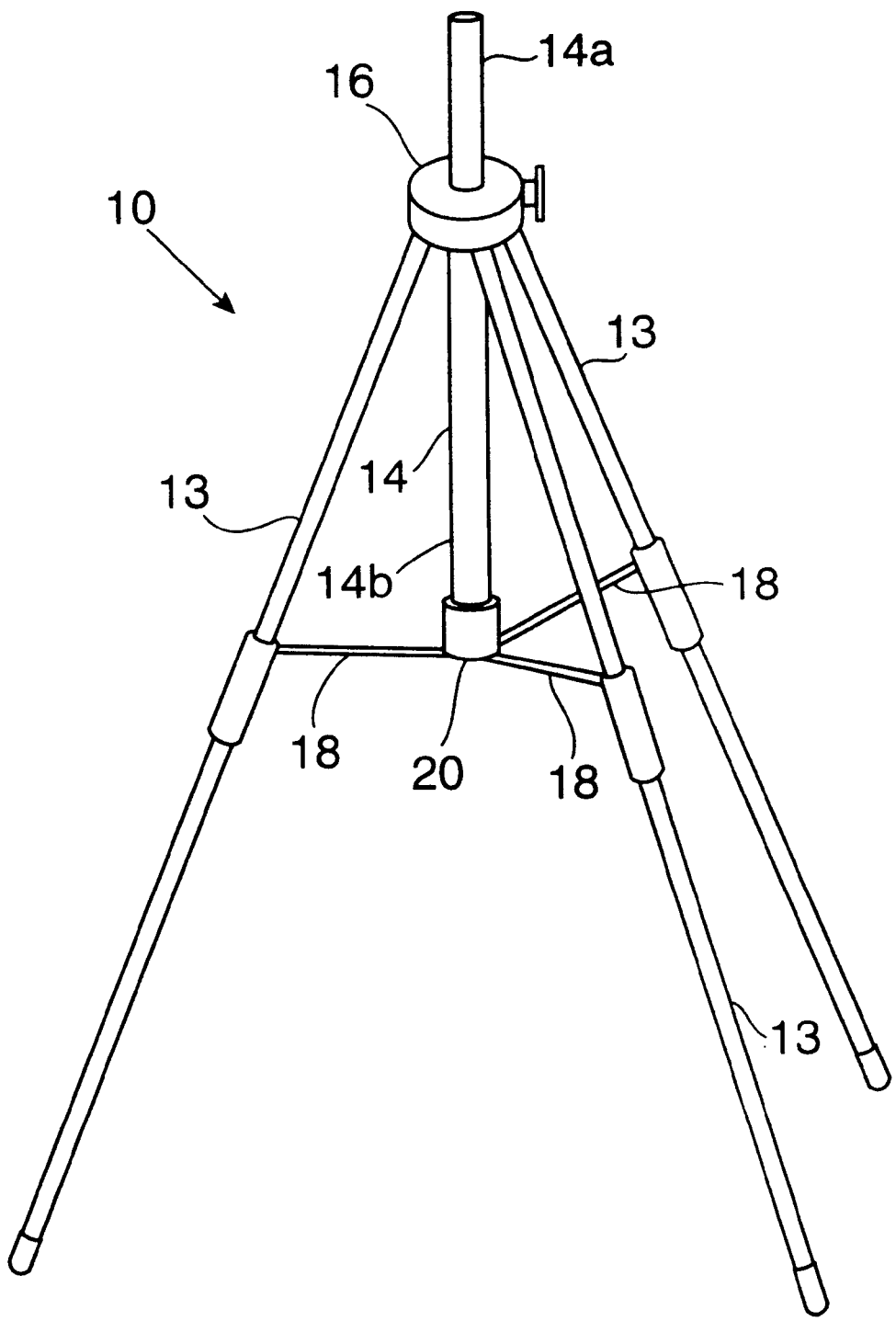
FIG. 1 is a perspective view of the lower section of a camera tripod typically used with a tray of the present invention.

Referring to FIGS. 1 and 2, a tray of the present invention is preferably used with a tripod 10 such as shown. The tripod 10 has three supporting legs 13 and a center post 14. The legs 13 are pivotally attached to a hub 16, and center post 14 slides vertically through a central aperture in the hub 16. The center post 14 has an upper portion 14a above the hub 16 and a lower portion 14b below the hub 16. When the tripod 10 is set up, stabilizing arms 18 extend from the legs 13 inward to a lower hub 20 which also receives the center post 14. The present invention provides a tray 22 that installs on a lower portion 14b of the center post 14 of a tripod 10 and may pivot about it while being supported by the stabilizing arms 18. The tray 22 has a peripheral wall 24 that clears the legs 13 of the tripod 10 as the tray 22 pivots.

Referring to FIGS. 2 and 3, in one embodiment, the tray 22 is semicircular in shape. It has a flat base 26 and a peripheral wall 24 extending upward from the base 26 along the peripheral edge of the base 26. The peripheral wall 24 has a semicircular-shaped portion 28 and a straight portion 30. A retaining device is attached to the straight portion 30 of the peripheral wall 24 at the longitudinal center of the straight portion 30. The retaining device could be any suitable device which allows removable attachment of the tray 22 to the post 14. The preferred retaining device is a C-shaped spring clip 32 designed to receive the lower portion 14b of the center post 14. The spring clip 32 captures the post 14 and provides some resistance to the pivotal motion of the tray 22 about the post 14. Alternatively, the retaining device may be a clamping device which more firmly fastens the tray 22 to the post 14.

With a spring clip 32 as the retaining device, a vertical support for the tray 22 is necessary to prevent the tray 22 from sliding down and off the center post 14. With tripods 10 such as the one shown in FIG. 1, the bottom of the base 26 rests on stabilizing arms 18, the lower portion 14b of the center post 14 typically has an end cap which prevents the spring clip 32 from sliding completely off the lower end of the center post 14. For such an application, the relatively high load on the spring clip 32 requires a strong clip 32 and a strong fastener between the clip 32 and the straight portion 30.

To install the tray 22 on the lower portion 14b of the center post 14, the tray 22 is manipulated into the space between the legs 13 and above the stabilizing arms 18, then positioned horizontally and pushed against the center post 14 so that the spring clip 32 engages the center post 14. The process is reversed to remove the tray 22 from the center post. The tray 22 is designed so that the radius of the semicircular portion 28 is sufficiently small to allow the spring clip 32 and the semicircular portion 28 to clear the center post 14 and legs 13, respectively, when the tray 22 is horizontal on top of the stabilizing arms 18 before and after installation on the center post 14.

Figure 4:
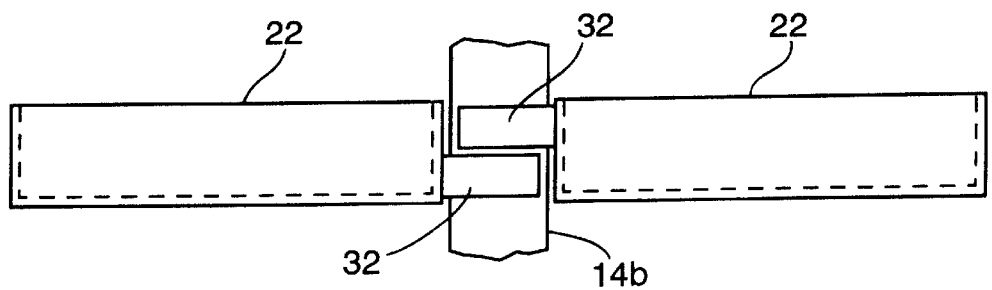
FIG. 4 is a side view of two trays of FIG. 2 installed on a center post of a tripod.

Referring to FIG. 4, two trays 22 of the configurations shown in FIGS. 2 and 3 may be attached to the center post 14 opposite one another to form a tray 22 of generally circular configuration. This is facilitated by vertically staggering the spring clips 32 on the pair of trays 22 so that one clip 32 is disposed above the other when both trays 22 are installed on the center post 14.

Referring to FIGS. 5–10, another embodiment of the present invention has a circular tray assembled around the lower portion 14b from first 40 and second 42 tray portions. The two portions 40, 42 are semicircular with an outer vertical wall like the tray 22 of FIG. 3. The first 44 and second 46 straight portions of the tray portions 40, 42 have recesses 48, 50 for receiving the center post 14. When the portions 40, 42 are joined, such as in FIGS. 6 and 8, the straight portions 44, 46 abut each other. In the preferred embodiment, the recesses 48, 50 provide clearance for the center post 14 when the portions 40, 42 are joined. Such a configuration is used when the tray portions 40, 42 are to be used with a tripod 10 having stabilizing arms 13 to support them. Alternatively, the recesses 48, 50 may be designed to frictionally interface with the center post 14 when the portions 40, 42 are joined. This may be accomplished by several methods, such as closely controlling the dimensions of the recesses 48, 50, applying a resilient friction material to the recesses 48, 50, or providing resiliency in the mechanisms for fastening the portions 40, 42 together.

Figure 5:
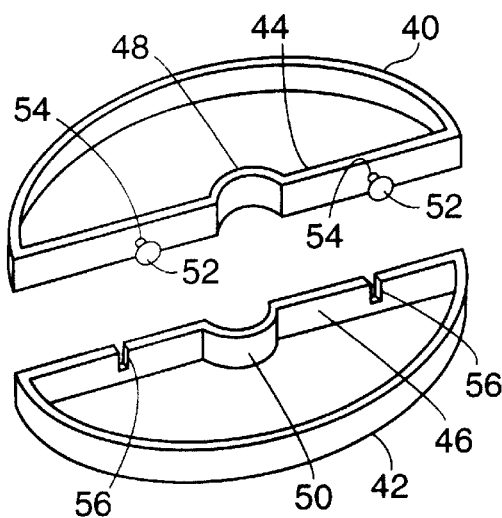
FIG. 5 is a perspective view of two separated trays of a second embodiment of the invention having two trays designed to join together.
Figure 6:
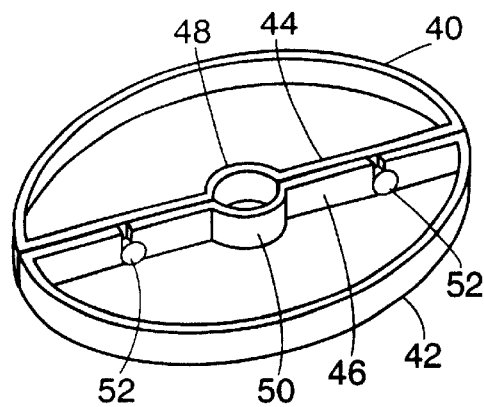
FIG. 6 is a perspective view of the trays of FIG. 5 showing the trays joined together.

The portions 40, 42 can be fastened together in ways which will provide abutment between the two portions without providing areas which will collect spilled materials, thus providing portions which are easy to assemble, dissassemble, and clean. For example, conventional mechanical fasteners can be us straight portions 44, 46 or other types of fasteners, such as cam-locks and spring-loaded pins may be used. To avoid needing separate fasteners, for example, a button and slot arrangement may be used as shown in FIGS. 5 and 6 whereby the first straight portion 44 has buttons 52 extending out from it with shanks 54. The straight portion 46 has associated slots 56 which receive the shanks 54. The length of the shanks 54 corresponds with the thickness of the straight section 46 so that the buttons 52 are snugly secured against the inside of the straight portion 46 when the portions 40, 42 are joined as shown in FIG. 6. If the recesses 48, 50 are to be tight against the center post 14, the shanks 54 may be made of resilient material to provide a clamping force, or the inner face of the buttons 52 may have resilient material for that purpose.

Figure 7:
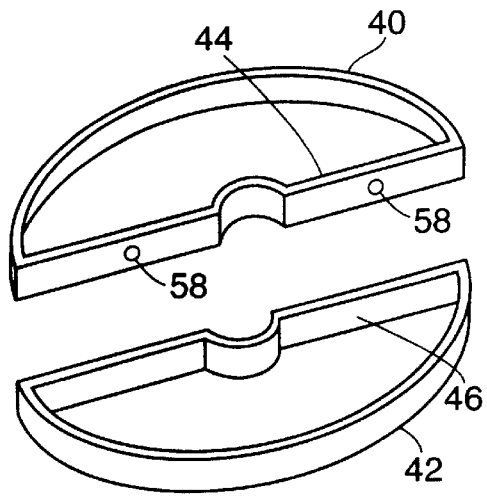
FIG. 7 is a perspective view of two separated trays of a third embodiment of the invention having two trays designed to join together.
Figure 8:
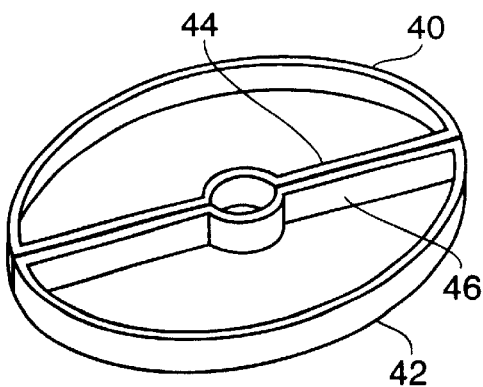
FIG. 8 is a perspective view of the trays of FIG. 7 showing the trays joined together.

To avoid having slots or apertures in the second straight portion 46 of the second tray portion 42, fastening devices may be attached to the straight portions 44, 46 of the tray portions 40, 42. For example, as shown in FIG. 7, one such device may be a magnet 58 which can be used if at least the second tray portion 42 is made of magnetic material. Preferably, magnets 58 are installed into the first straight portion 44 flush with its outer surface, thereby allowing the first 44 and second 46 straight portions to abut each other as shown in FIG. 8. Alternatively, magnets 58 may be attached, such as by bonding, to the straight first straight portion 44 so that they may protrude from the outer surface of the first straight portion 44. Magnets 58 may be used with trays made of non-magnetic material, such as plastic, if pieces of magnetic material are installed on or in the second straight portion 46 of the second tray portion 42 to correspond with locations of the magnets 58 in the first straight portion 44 of the first tray portion 40. For plastic trays, such inserts and magnets may be molded directly into the tray.

Hook and loop fastener material may also be used in a similar fashion to fasten the first straight portion 44 to the second straight portion 46. The hook portion of the material may be attached to one of the straight portions 44, 46, and the loop portion of the material may be attached to the other of the straight portions 44, 46, such as by bonding or adhesive. With such fastening material, straight portions 44, 46 would not abut each other when the tray portions 40, 42 are joined.

Figure 9:
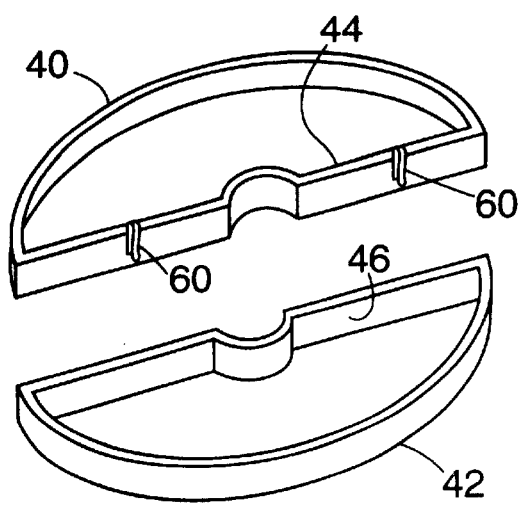
FIG. 9 is a perspective view illustrating how two trays join together using spring clips mounted on the outside of one tray.
Figure 10:
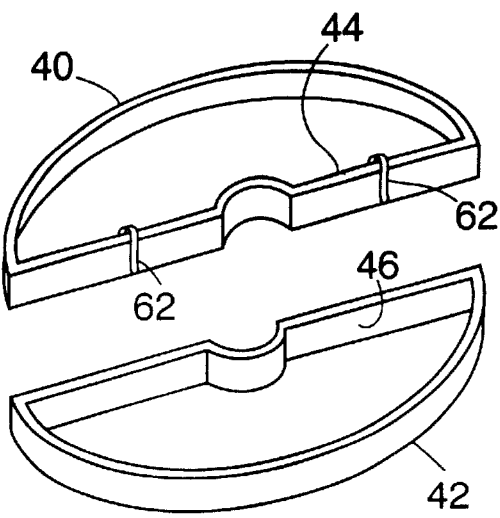
FIG. 10 is a perspective view illustrating how two trays join together using spring clips mounted on the inside of one tray.

Spring clips 60 may also be used to join the tray portions 40, 42, for example, as illustrated in FIGS. 9 and 10. Spring clips 60, resembling hair pins, are connected to the first straight portion 44 of the first tray portion 40 and receive the second straight portion 46 of the second tray portion 42. The spring clips 60 may be attached to the outside of the first straight portion 44 as illustrated in FIG. 9 such as by bonding, riveting, or tack welding. Alternatively, spring clips 62 may be attached to the inside of the first straight portion 44 and extend over the outside of it as illustrated in FIG. 10. With this arrangement, the clips 62 need not be attached to the first straight portion 44, but rather may be separate elements installed over both first 44 and second 46 straight portions when first 40 and second 42 tray portions are joined.

Figure 11:
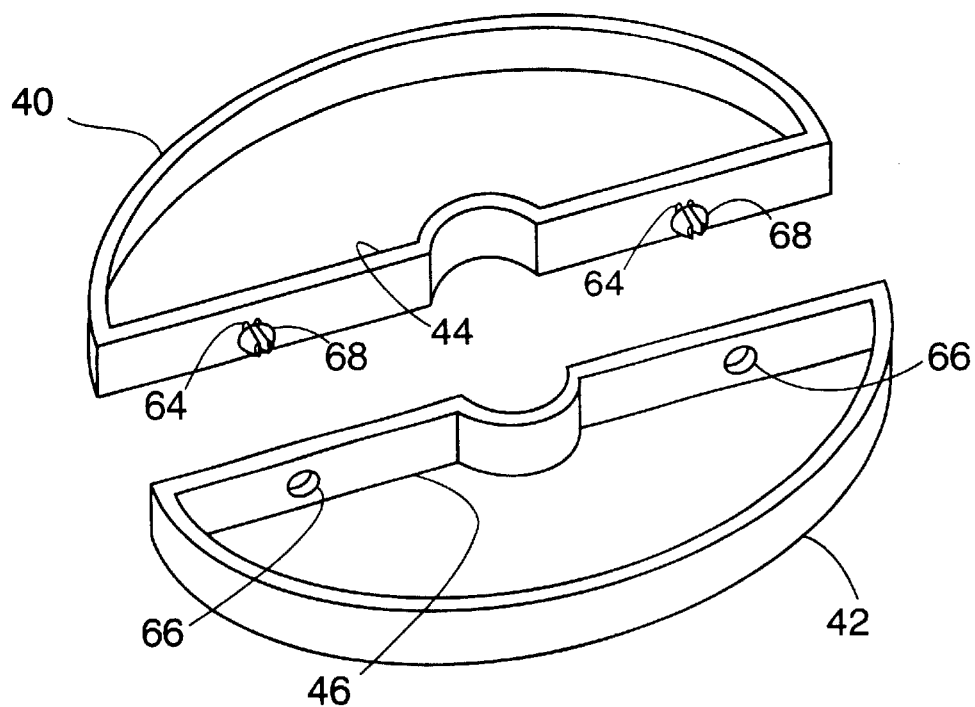
FIG. 11 is a perspective view illustrating how two plastic trays maybe joined together using conical slotted pins and associated apertures.

Referring to FIG. 11, if the trays are plastic, various devices well known in the art of joining plastic parts can be used to attach the first 40 and second 42 tray portions. One such device, for example, provides conical slotted pins 64 extending outward from the first straight portion 44 and corresponding apertures 66 in the second straight portion 46. The conical portions 68 of the slotted pins 64 pass through apertures 66 as the pins 64 compress together and are retained on the inside of the straight portion 46. The shape of the conical portions 68 can be designed to facilitate optimal assembly and disassembly forces required.

Figure 12B:
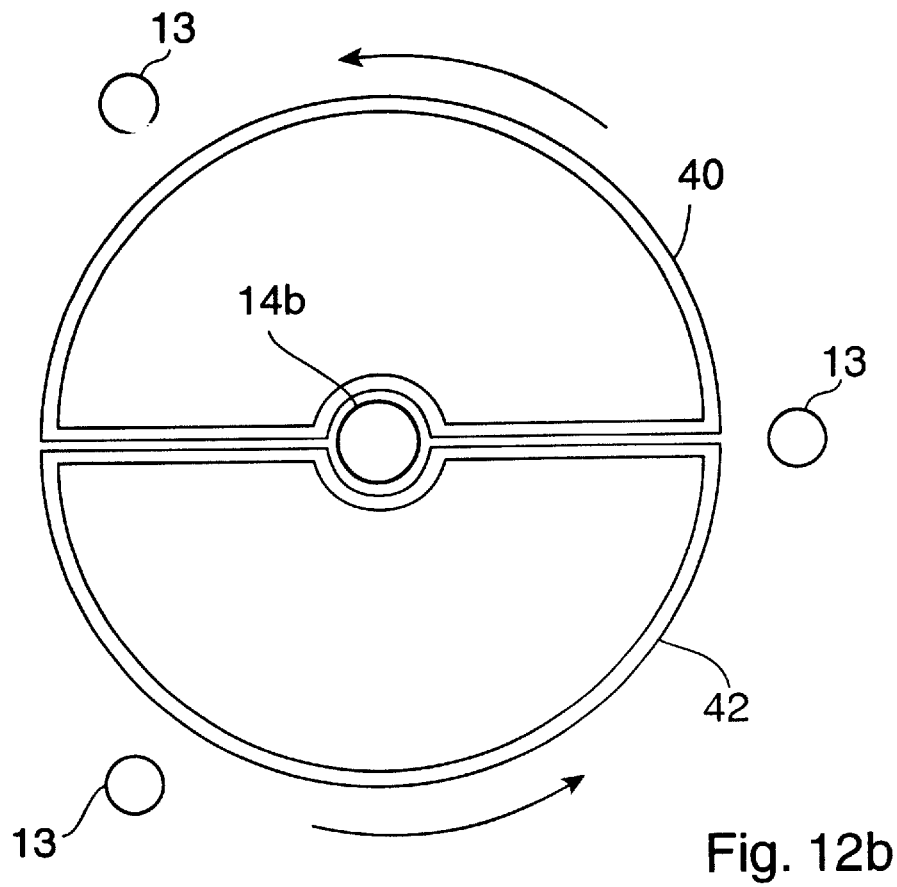
FIG. 12b is a view along line 12—12 of FIG. 2 illustrating the position of a tray of FIG. 8 relative to tripod legs and its rotation about the center post.
Figure 12A:
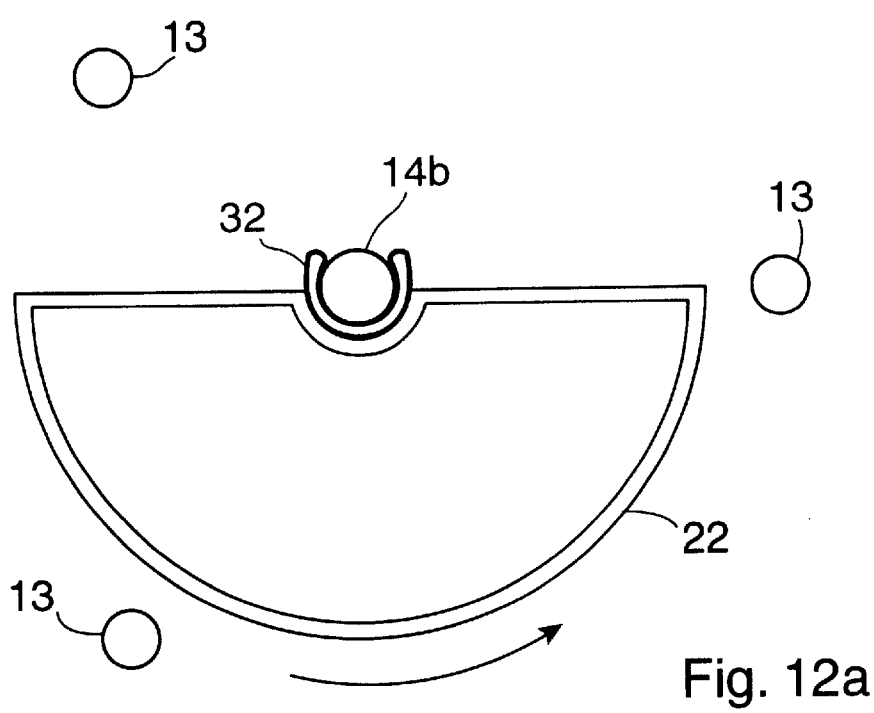
FIG. 12a is a view along 12—12 of FIG. 2 illustrating the position of a tray of FIG. 2 relative to tripod legs and its rotation about the center post.

As illustrated in FIGS. 12a and 12b, trays of the present invention can be manually pivoted about the center post 14. To assure smooth movement during pivoting, the bottom of the base 26 preferably should be smooth and flat with no significant protrusions to bump into the stabilizing arms 18. Likewise, the joints between two mating tray portions 40, 42 should not have structure that extends downward from the base 26 since that would interfere with rotation.

The accessory tray of the present invention provides a stable platform that removably attaches to the lower portion 14b of the center post 14 of a camera tripod 10. The tray is sheltered by the tripod legs 13 to minimize risk of items on the tray being inadvertently knocked off. The tray may be manually pivoted about the center post 14 to allow easy access to items on the tray from any side of the tripod 10.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A combination comprising:
    (i) a camera tripod having
        (a) three supporting legs,
        (b) a hub having a central aperture, and
        (c) a center post which slides vertically through the central aperture of the hub, which center post has a lower portion below the hub, and
    (ii) an accessory tray, which accessory tray has a base which:
        (a) is semicircular in shape having an arcuate edge and a straight edge,
        (b) has a peripheral wall extending upward from the arcuate and straight edges, and
        (c) has a retaining device attached to the straight edge, which retaining device attaches to the lower portion of the center post.

2. The combination of claim 1, wherein the tripod has a lower hub having a central aperture, stabilizing arms which extend from the supporting legs to the lower hub, and the accessory tray rests on the stabilizing arms.

3. A combination comprising:
    (i) a camera tripod having
        (a) three supporting legs,
        (b) a hub having a central aperture,
        (c) a lower hub having a central aperture, and
        (d) a center post which slides vertically through the central apertures of the hub and the lower hub, which center post has a lower portion below the hub, and
        (e) stabilizing arms extending from the legs to the lower hub and
    (ii) an accessory tray having a circular configuration, which accessory tray rests upon the stabilizing arms and which accessory tray comprises two portions, each portion being semicircular in shape, having an arcuate edge and a straight edge with a peripheral wall extending upward from the arcuate edge and the straight edge, the straight edges having recesses at their midpoints for receiving the center post of the tripod, the straight edges being joined by means selected from the group consisting of (a) cam locks and springloaded pins, (b) button and slot configuration wherein the button is extended from the straight edge with a shank, (c) magnets, (d) hook and loop fasteners, (e) spring clips, and (f) conical slotted pins fitting into corresponding apertures.

4. A combination consisting essentially of
    (i) a camera tripod having
        (a) three supporting legs,
        (b) a hub having a central aperture,
        (c) a lower hub having a central aperture, and
        (d) a center post which slides vertically through the central apertures of the hub and the lower hub, which center post has a lower portion below the hub, and
        (e) stabilizing arms extending from the legs to the lower hub and
    (ii) an accessory tray having a circular configuration, which accessory tray rests upon the stabilizing arms and which accessory tray comprises two portions, each portion being semicircular in shape, having an arcuate edge and a straight edge with a peripheral wall extending upward from the arcuate edge and the straight edge, the straight edges having recesses at their midpoints for receiving the center post of the tripod, the straight edges of the two portions being joined together.

\* \* \* \* \*